US011955873B2

(12) United States Patent
Gandolfi et al.

(10) Patent No.: US 11,955,873 B2
(45) Date of Patent: Apr. 9, 2024

(54) DRIVE TRAIN

(71) Applicant: AUTOMATA TECHNOLOGIES LIMITED, London (GB)

(72) Inventors: Massimo Gandolfi, San Lazzaro di Savena (IT); Neil Patrick Keegan, London (GB)

(73) Assignee: Automata Technologies Limited, London (GB)

( * ) Notice: Subject to any disclaimer, the term of this patent is extended or adjusted under 35 U.S.C. 154(b) by 438 days.

(21) Appl. No.: 17/287,909

(22) PCT Filed: Oct. 25, 2019

(86) PCT No.: PCT/GB2019/053034
§ 371 (c)(1),
(2) Date: Apr. 22, 2021

(87) PCT Pub. No.: WO2020/084316
PCT Pub. Date: Apr. 30, 2020

(65) Prior Publication Data
US 2021/0399608 A1 Dec. 23, 2021

(30) Foreign Application Priority Data

Oct. 25, 2018 (GB) ..................... 1817380

(51) Int. Cl.
H02K 7/116 (2006.01)
B25J 9/12 (2006.01)
(Continued)

(52) U.S. Cl.
CPC .............. H02K 7/116 (2013.01); B25J 9/126 (2013.01); H02K 7/08 (2013.01); H02K 11/21 (2016.01)

(58) Field of Classification Search
CPC ....... B25J 9/126; H02K 11/21; H02K 11/215; H02K 7/116; H02K 7/08
See application file for complete search history.

(56) References Cited

U.S. PATENT DOCUMENTS 4,951,517 A 8/1990 Azuma et al.
2012/0286629 A1* 11/2012 Johnson ................ H02K 29/08
310/68 B
(Continued)

FOREIGN PATENT DOCUMENTS

EP 0621112 A1 10/1994
EP 1163984 A1 12/2001
(Continued)

OTHER PUBLICATIONS

International Search Report in related application PCT/GB2019/053034 dated Jan. 17, 2020.
(Continued)

Primary Examiner — Bryan R Perez
(74) Attorney, Agent, or Firm — Patterson + Sheridan, LLP

(57) ABSTRACT

A drive train is provided comprising: a motor assembly, a gear box assembly (40) and an encoder assembly. The motor assembly comprises an electric motor (21) and a rotatable shaft (26) defining an input axis (27), the shaft (26) comprising a first set of gear teeth (28). The gear box assembly (40) comprises an annular gear (48, 50) comprising a second set of gear teeth (48, 50) which intermesh with the first set of gear teeth (28), and a housing (42, 44, 45) which comprises a fixed portion (42) to which the motor assembly is mounted and a rotatable portion (45) fixed to the annular gear (48, 50) and providing the output from the drive train about an output axis (72) offset from the input axis (27). The encoder assembly is arranged and configured to measure the rotation at the output axis (72). A central opening is defined (Continued)

through the gearbox assembly (40) in alignment with the output axis (72) and passing through the housing (42, 44, 45) and the annular gear (48, 50). The motor assembly is mounted so as to not obstruct the central opening. The encoder assembly comprises an annular first portion (71) mounted to the rotatable portion (45) of the gearbox assembly (40) about the central opening, and a second portion fixed with respect to the fixed portion (42) of a gearbox assembly housing (42, 44, 45) to measure the rotation of the annular first portion (71).

13 Claims, 5 Drawing Sheets

(51) Int. Cl.
*H02K 7/08* (2006.01)
*H02K 11/21* (2016.01)

(56) References Cited

U.S. PATENT DOCUMENTS

2016/0101526 A1    4/2016   Saito et al.
2018/0200896 A1*   7/2018   Boyland ................ H02K 7/102

FOREIGN PATENT DOCUMENTS

| | | |
|---|---|---|
| EP | 1625920 A1 | 2/2006 |
| EP | 2077404 A1 | 7/2009 |
| EP | 2664422 A1 | 11/2013 |
| JP | H0415345 A | 1/1992 |
| WO | 1987/05554 A1 | 9/1987 |

OTHER PUBLICATIONS

Combined Search and Examination Report in related application GB1817380.7 dated Apr. 23, 2019.

* cited by examiner

DRIVE TRAIN

The present invention relates to a drive train. In particular, it relates to a drive train for a robot arm.

Robot arms in many different guises have been known for decades. Generally such robots are heavy and are operated behind safety barriers. We are developing a robot arm which is specifically designed for smaller scale applications and which has an order of magnitude cost reduction as compared to a conventional industrial robot.

The main component of a robot arm is the drive train (a combination of a motor assembly and gearbox assembly) which is used to rotate one linkage on the robot arm with respect to an adjacent linkage. Conventional drive trains are too expensive for a low cost arm. The technical challenges that we face are to redesign the drive train at a fraction of the cost while meeting a number of essential design requirements. These include the need for a low weight drive train which is still able to transmit the necessary power with a high degree of precision and which is also simple to manufacture and maintain. Further, the drive train must allow the wires required for any downstream drive trains or end effector to pass through the drive train along its axis of rotation so that the wires do not become entangled as the arm moves.

The present invention aims at solving one or more of these problems.

According to the present invention, there is provided a drive train according to claim 1.

In a traditional drive train, the input and output axis are aligned. By offsetting this input and output axes, and using an annular gear to transmit the power from the motor assembly into the gearbox, the central opening can then be formed through the gearbox assembly. Because the motor assembly is offset from the central opening, there is no need for the motor assembly to be built around the central opening. This allows a more conventional motor to be used thereby reducing costs and allowing for a more compact design. Further, the simplicity of the drive train allows for a low cost and low backlash solution.

The drive train preferably further comprises an encoder assembly to measure the position at the output axis; the encoder comprising an annular first portion mounted to the rotatable portion around the central opening and a second portion fixed with respect to the fixed portion of the gearbox assembly housing to measure the rotation of the first annular portion.

This places the encoder directly on the output axis and within the gearbox assembly. This provides a simple construction in which a more direct measurement is possible than with the prior art in which the encoders are generally positioned outside of the rotating component.

Further, the drive train preferably further comprises a main bearing between the fixed and rotatable parts of the housing of the gearbox assembly and an encoder bearing between the first and second portions of the encoder to rotatably support and maintain the alignment of the first and second portions.

The main bearing is subject to wear over time. In a conventional drive train without the separate encoder bearing, this will cause lateral movement of the two encoder components with respect to one another leading to inaccuracies in the encoder output. In the present case, however, the alignment of the two encoder components is maintained by a separate encoder bearing. Therefore even as the main bearing wears, the positional relationship between the encoder components is maintained.

This wearing of the main bearing while the encoder bearing maintains the alignment between the bearing components will cause a slight eccentricity of the movement of the encoder with respect to the fixed part of the housing. This has the potential to cause internal stresses and/or vibrations. Preferably, however, the mounting for the second portion of the encoder with respect to the fixed portion of the gearbox is flexible in a direction transverse to the output axis. Therefore, even if the eccentric movement referred above occurs, any such eccentric movement can be absorbed in the flexible mounting such that the drive assembly can continue to operate satisfactorily even after some wearing of the main bearing has occurred.

The flexible mounting preferably comprises a sleeve arranged around the output axis. This provides a convenient way of attaching the encoder to the fixed portion on the housing which does not obstruct the central opening.

The encoder assembly may be integrated into the gearbox assembly. However, preferably, the encoder assembly is provided as a unitary assembly removable together from the gearbox assembly housing without requiring disassembly of the housing.

It is particularly convenient to provide the encoder assembly as a unitary assembly when it has its own bearing assembly. Further, a unitary encoder assembly can be tested and certified as a subassembly separately from the gearbox assembly. In the event of a problem with the encoder assembly, the unitary assembly can simply be removed and replaced as it does not require disassembly of the gearbox assembly housing. In a conventional drive train, the encoder is not modular and/or is mounted well within the gearbox assembly so that is replacement requires a significant disassembly of the gearbox itself.

Preferably a planetary gearbox is provided between the motor and the rotatable shaft. This is most commonly provided as part of the motor assembly. This allows the use of a relatively high speed, low power motor providing a further cost benefit. The fact that the motor assembly is mounted in the offset manner described above allows the planetary gearbox to be used as wires do not need to pass through motor assembly.

The annular gear may be a single component as the connection between this and the first set of gear teeth can be achieved in a manner which provides a low backlash. However, preferably in order to reduce the backlash further, the annual gear preferably comprises two annular components each having teeth which are offset from one another and which together comprise the second set of gear teeth, the two annular components being concentrically mounted adjacent to each other being circumferentially biased with respect to each other to generate a pinching force on a first set of gear teeth. This is known as a scissor gear and this can eliminate the backlash and this interface.

The second set of gear teeth may be on an outer face of the annular gear. However, a more compact design is provided by the second set of gear teeth being on an inner face of the annular gear.

The rotatable portion of the gearbox housing preferably has means for attaching an external component. In the context of a robot arm linkage, this allows an adjacent arm to be attaching directly to the rotatable portion of the gearbox housing.

In this case, the invention extends to a robot arm linkage comprising a drive train according to the first aspect of the invention attached at one end of the arm, an adjacent arm linkage being attachable to the means for attaching an external component and wherein wire for the adjacent arm linkage pass through the central opening. With such an arrangement, by removing an adjacent arm linkage from the housing of an adjacent arm linkage, the gearbox housing of the first linkage is exposed. When the encoder assembly is provided as a unitary assembly as described above, this can very easily be removed and repaired or replaced as necessary.

The present invention further extends to a robot arm having a plurality of arm linkages as set out above attached together. Preferably, the encoder for a respective drive train is exposed by removal of an adjacent arm linkage.

An example of drive train, robot arm linkage and robot arm according to the invention will now be described with reference to the accompanying drawings, in which.

Figure 1:
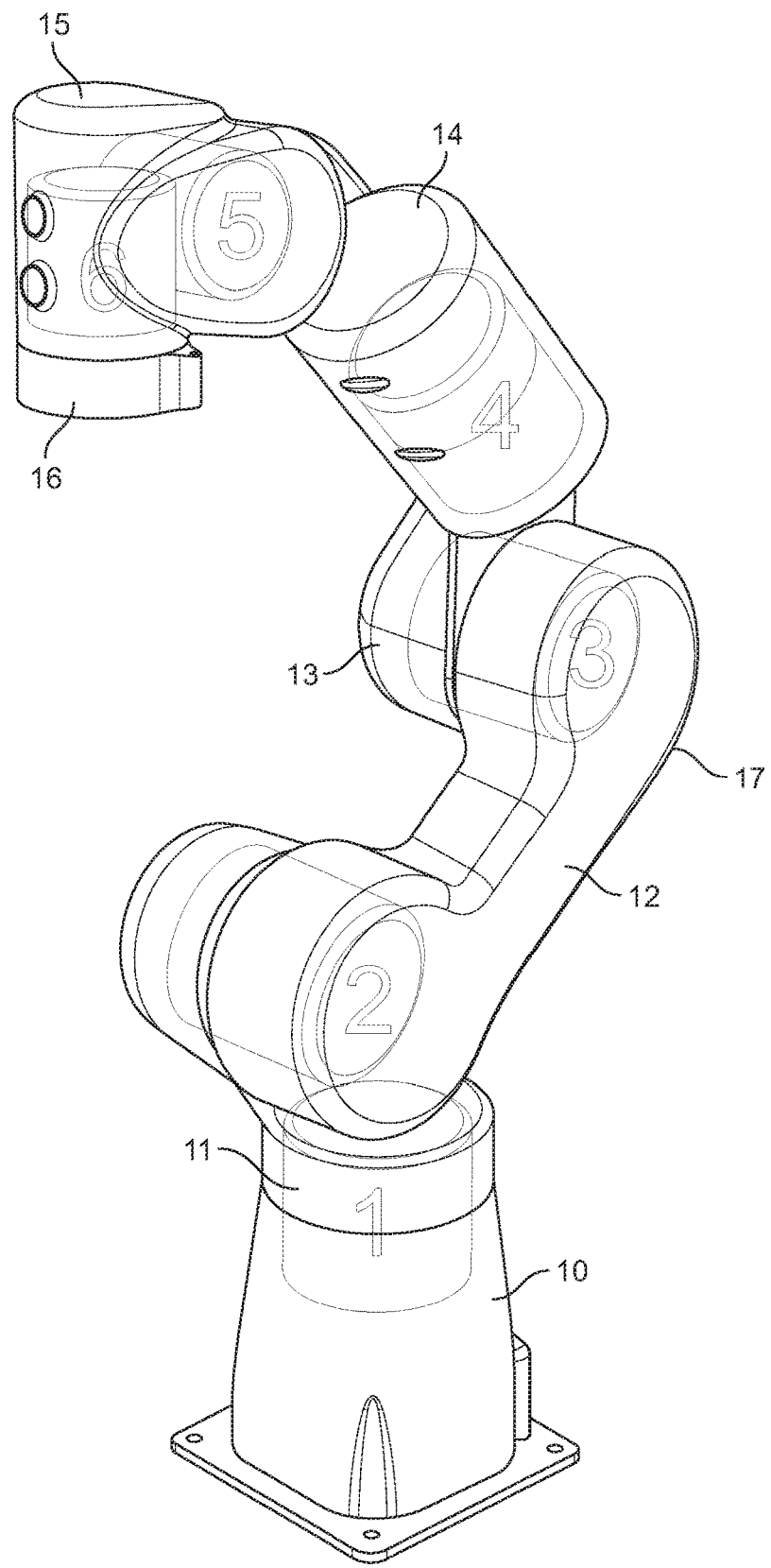
FIG. 1 is a diagrammatic perspective view of a robot arm.

A typical robot arm which can use the present invention is shown in FIG. 1. This has six axes of rotation and hence six drive trains labelled 1-6 in FIG. 1. Each of these drive trains is positioned at an interface between adjacent links.

Beginning from the base 10 there is a first linkage 11 driven by first drive train 1, a second linkage 12 driven by the second drive train 2, a third linkage 13 driven by the third drive train 3; a fourth linkage 14 driven by a fourth drive train 4, a fifth linkage 15 driven by a fifth drive train 5 and an end effector mount 16 driven by a sixth drive train 6.

Each linkage is provided with a cover shell (eg. see reference numeral 17 for the shell of linkage 12). This is removable to allow access to the drive trains as described below.

In order to provide control signals and power to all of the downstream drive trains 2-6, it is a wired connection is provided. In order to avoid becoming entangled, this wired connection should extend along the axis of rotation at each rotational interface. The challenge is to achieve this in a compact and cost effective manner while still maintaining a very high degree of accuracy required for the manipulation of the robot arm.

It should be noted that the sixth drive train 6 does not need to have any wires passing through it such that, although it could be designed to be in accordance with the drive train of the present invention, it does not need to be.

Each of the first five drive trains 1-5 may have the same construction as described in greater detail with reference to FIGS. 1 to 5 which describe the drive train as a whole and FIGS. 6 and 7 which show the encoder module. The size of each drive train 1 to 5 may vary depending upon the output requirements.

Figure 4:
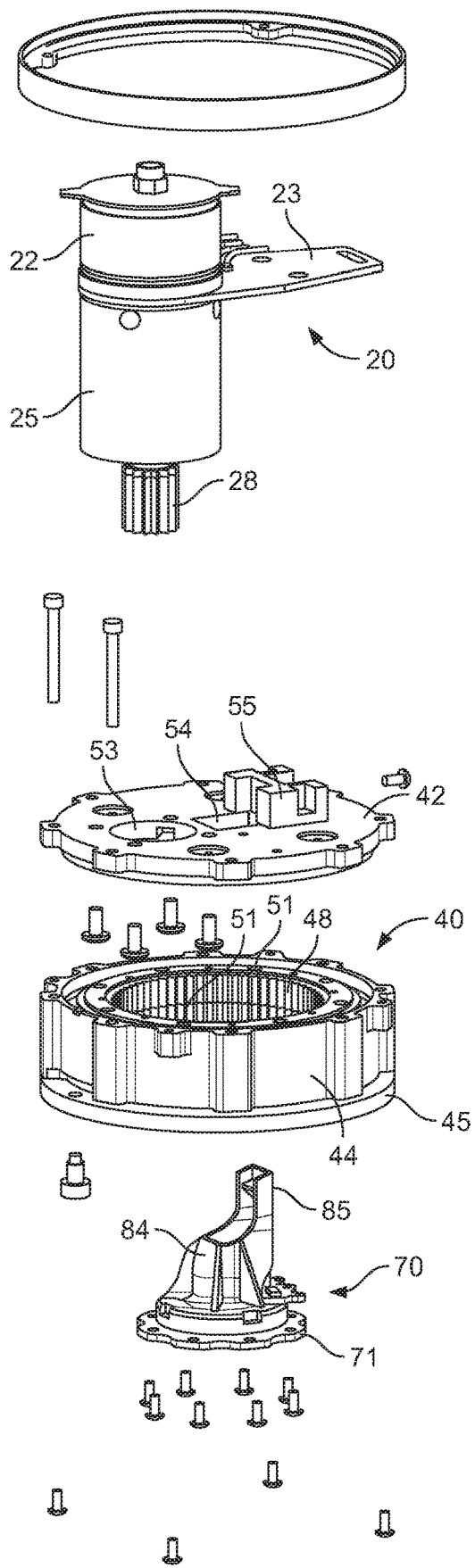
FIG. 4 is an exploded perspective of the drive train.

The drive train comprises three linked modules as best shown in FIG. 4. These are a motor assembly 20, a gear box assembly 40 and an encoder module 70 which are described in greater detail below.

The motor assembly 20 comprises an electric motor 21 provided with a wiring terminals 22 and a control board 23. The motor 21 has a shaft 24 connected to a planetary gearbox 25.

This has a conventional construction and will therefore not be described in greater detail here. The function of the planetary gearbox is to increase the power output and reduce the rotational speed of the motor output. The planetary gearbox has a shaft defined here as an input shaft 26 as it is an input into the gearbox assembly. The input shaft 26 rotates around an input axis 27 and is provided with plurality of axially extending gear teeth 28.

The gear box assembly 40 will now be described with reference to FIGS. 2 to 5.

The gearbox assembly comprises a housing 41 which is made up of an upper housing plate 42 and a lower housing body 43. The lower housing 43 broadly comprises a peripheral wall portion 44 and a rotatable lower housing plate 45 which define a cavity with the upper housing portion 42. The peripheral wall portion 44 is rigidly fixed to the upper housing plate 42 to form a static part of the gearbox assembly, while the lower housing plate 45 with various other components attached (as described below) is rotatably supported with respect to the fixed portion via upper 46 and lower 47 bearings. These are thin section angular contact bearings mounted back to back in order to carry heavy loads. Within the housing 41 is an annular gear 48 comprising an upper gear ring 49 and a lower gear ring 50 each formed a plurality of axial teeth 51 which are complimentary to the gear teeth 28 on the motor assembly. The gear teeth 51 of the upper 49 and the lower 50 rings are circumferentially offset with respect to one another. A biasing mechanism in the form of one or more springs (not shown) is provided to bias the upper 49 and lower 50 rings with respect to one another in opposite directions so that the teeth 51 form a pinching action on the respective tooth 28 on the motor assembly 20 whereby eliminating the backlash across this interface. Such a biased gear mechanism is known in the art as a scissor gear.

The annular gear 48 is supported in an annular gear housing 52 which is connected at its lower end to the lower housing plate 45 and is supported at its upper end by the upper bearing 46.

Thus, rotation of the input shaft 26 causes rotation of the annular gear 48 in view of the connection between the gear teeth 28 and 51.

Figure 5:
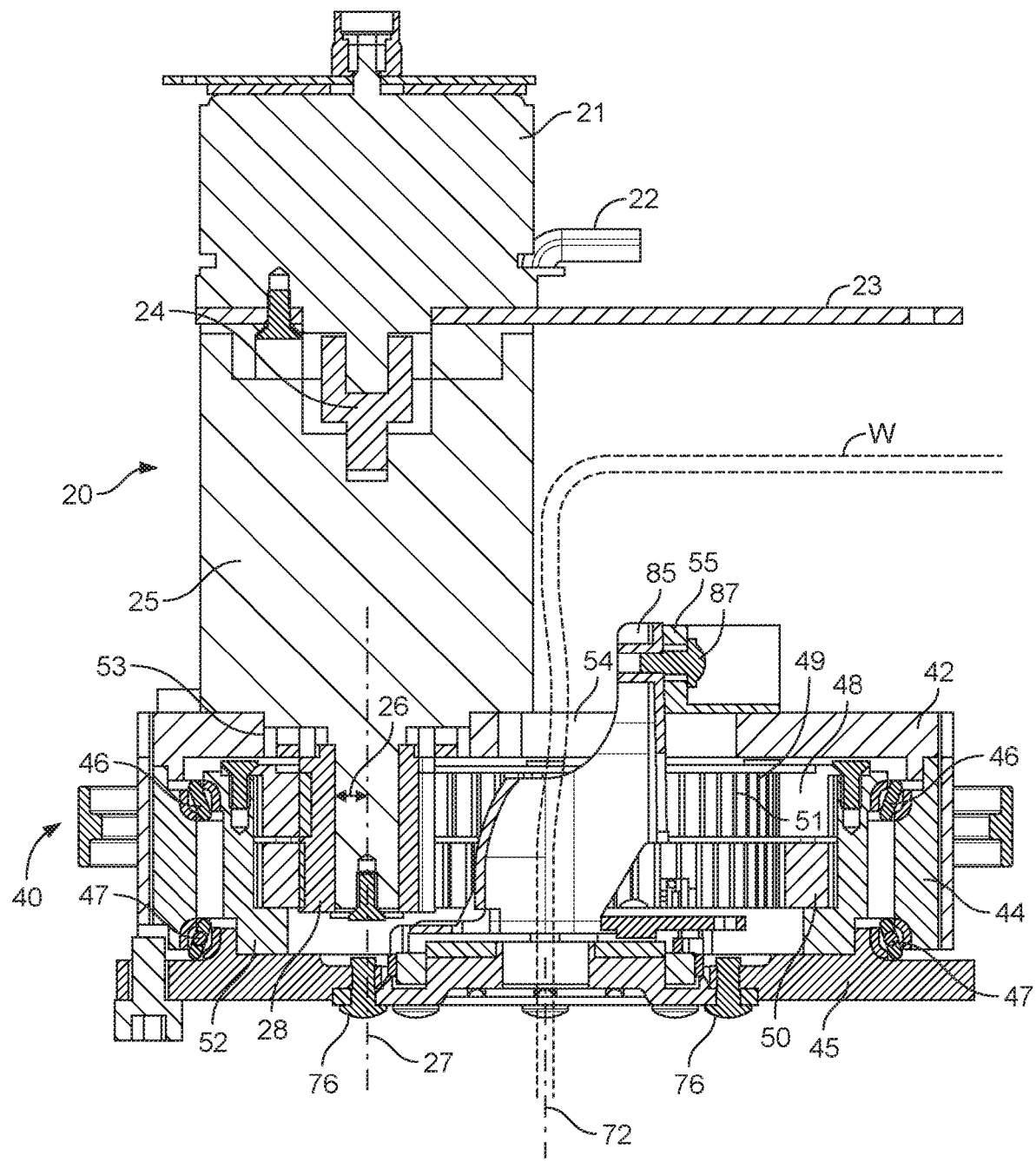
FIG. 5 is a section through line A-A in FIG. 2 through a median plane of the drive train containing the motor assembly.

The upper housing plate 42 is provided with a motor orifice 53 to receive the motor assembly 20 in the position shown in FIG. 5 in which the gear teeth 28 engage with the gear teeth 51. The motor assembly 20 is secured in this position. The upper housing plate 42 is also provided with a central orifice 54 adjacent to which is a mounting boss 55 for reasons which will be described subsequently.

The lower housing plate 45 provides the output interface and is provided with a plurality of mounting orifices 56 (see FIG. 2) to which an external component is mounted. In the case the robot arm shown in FIG. 1, an adjacent linkage would be attached by being bolted via these orifices 56.

In the robot arm, when a controller of the robot arm requires rotation of one of the linkages, a signal is sent to the electric motor 21 via the control board 23 and wiring terminal 22. The motor 21 then rotates by the required amount. This rotation is transmitted by the planetary gear box 25 which increases the torque and reduces the speed. This rotation is then transmitted via the teeth 28, 51 to the annular gear 48 which rotates together with the gear housing 52 and the lower housing plate 45 within the upper 46 and lower 47 bearings about output axis 72. The upper housing plate 42 and peripheral portion 44 remain stationary together with the motor assembly. This provides a further increase in torque and reduction in speed thereby rotating the lower housing plate 45 and hence the attached linkage by the required amount. The drive train is therefore a simple one which can be configured to create little or no backlash.

Figure 2:
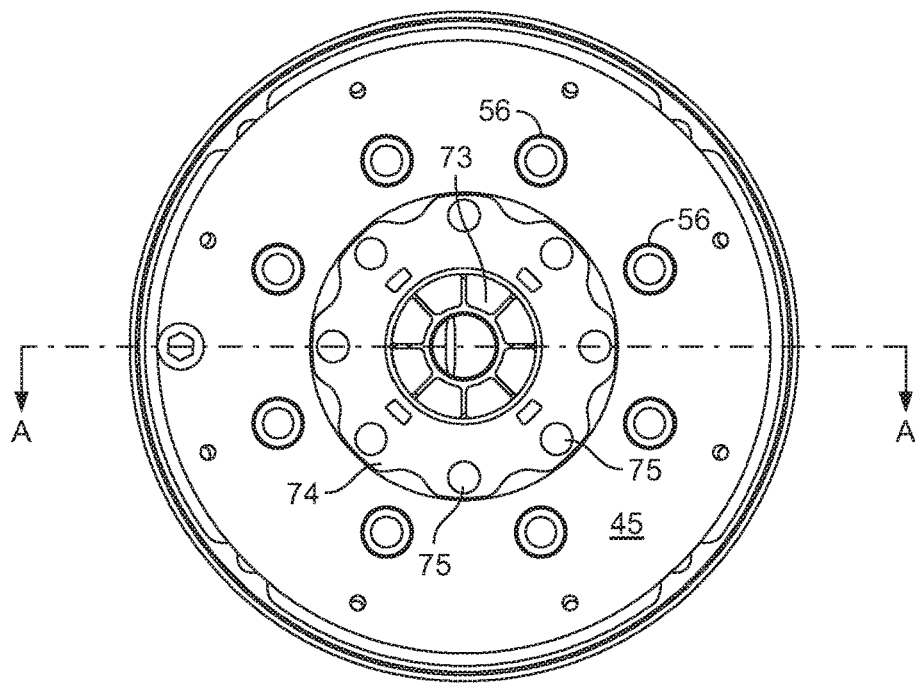
FIG. 2 is a plan view from below of the drive train.
Figure 3:
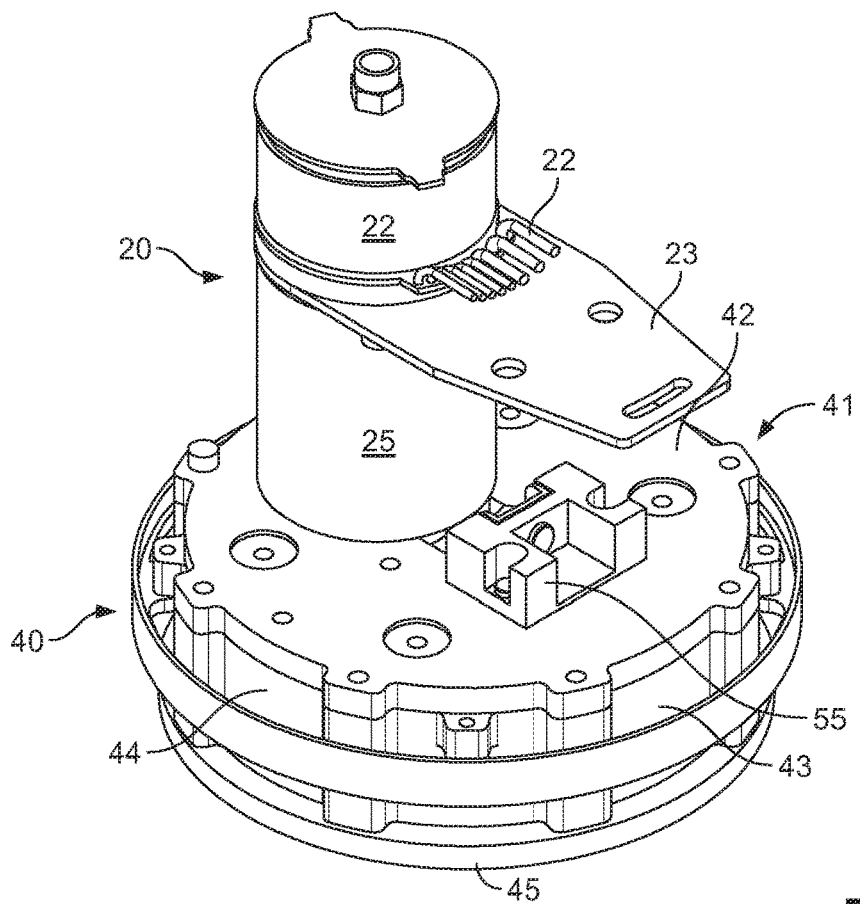
FIG. 3 is a perspective view of the drive train.
Figure 6:
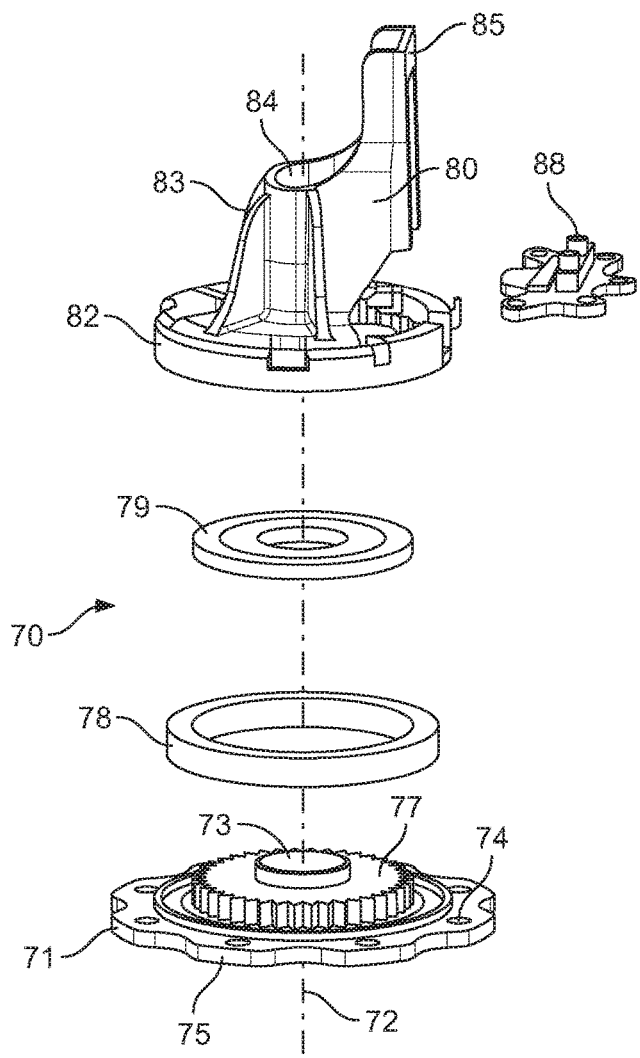
FIG. 6 is an exploded perspective view of the encoder unit.
Figure 7:
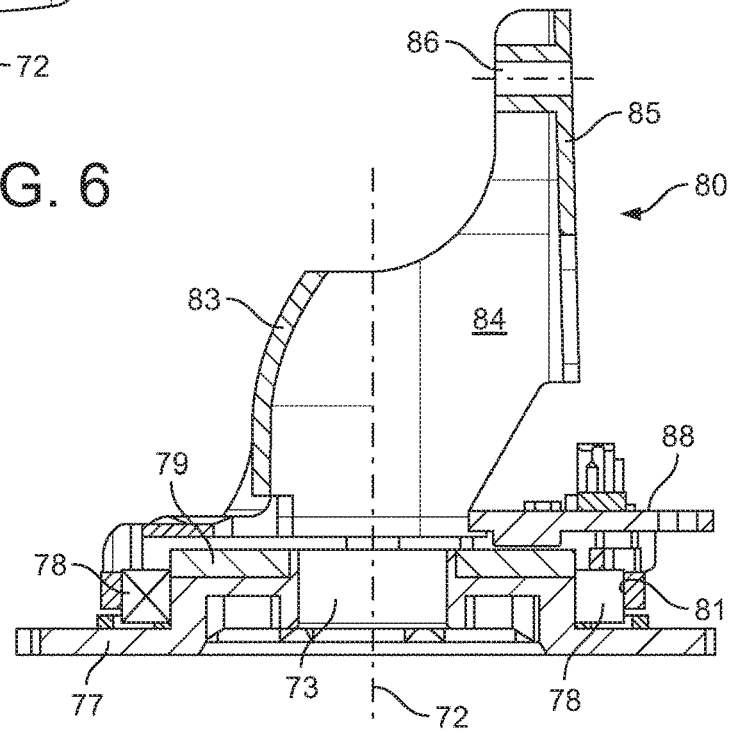
FIG. 7 is a cross-section of the encoder unit.

The rotation of the lower housing plate 45 is measured using the encoder module 70 which is shown in FIGS. 6 and 7. FIGS. 2 and 5 show how the encoder module is connected to the gearbox assembly 40.

The main components of the encoder module 70 are best shown in FIG. 6. This comprises a lower support plate 71 which has a generally circular configuration centred on an output axis 72. The lower support plate 71 has a central opening 73 and an outer flange 74 with a plurality of mounting holes 75 via which the lower support plate 71 is bolted to the lower housing plate 45 by a plurality of bolts 76 so that the two plates 45, 71 rotate together (see also FIG. 2). The lower support plate 71 has a boss 77, centred on the output axis 72, the outer face of which receives an encoder bearing 78. On the upper face of the boss 77 is a magnetic ring 79 which is fixed to the lower support plate 71 to rotate with it.

On the outside of the encoder bearing 78 is the encoder support bracket 80, the lower end of which has an internal face 81 which surrounds and engages with the bearing 78. The encoder support bracket 80 has the complex shape best seen in FIG. 6. The lowermost portion 82 has a generally annular configuration which can fit around the bearing 78 as described above. Extending upwardly from there is a generally hollow sleeve-like structure 83 which has an open centre 84 aligned with the central opening 73 in the lower support plate 71. This sleeve-like structure 84 extends upwardly on one side to a mounting boss 85 which has a mounting hole 86 via which the encoder module 70 is bolted to the upper housing plate 42 by a bolt 87 as best shown in FIG. 5.

As will be appreciated from FIGS. 6 and 7, the mounting bracket has a relatively long yet thin walled structure. Because of its complex structure, it is preferably a moulded plastic component. It is deliberately designed in this way so that it has a relatively high degree of flexibility in the lateral direction (in the left and right hand directions in FIGS. 6 and 7).

The reason for this is explained below. The final part of the encoder module 70 is the output encoder board 88 this is fixed with respect to the encoder support 80. The output encoder board 88 faces the magnetic ring 79. As the magnetic ring 79 rotates under the output encoder board 88, the passing of the magnetic poles on a magnetic ring 79 is detected by the output encoder board 88 thereby enabling the speed of rotation to be sensed. Whilst the encoder has been described as a magnetic encoder, any suitable encoder may be used.

When the lower housing plate 45 is rotated as discussed above, the main load during this rotation is transmitted through upper 46 and lower 47 bearings. Over time these will be prone to wear, so that lower housing plate 45 may start to rotate eccentrically about the output axis 72. However, the alignment between the components of the encoder, namely the magnetic ring 79 and the output encoder board 88 is determined only by the encoder bearing ring 78. As this is not subjected to the main loads, this will not experience any significant wear. As such, the alignment between the magnetic ring 78 and the output encoder board 88 is maintained even when the main load bearings 46 and 47 wear. Further, this wear will cause small lateral movements of the lower support plate 71. This will not affect the ability of the encoder to operate which, as a critical relationship is maintained by the encoder bearing ring 78 as mentioned above. Further, the flexible sleeve-like structure 83 ensures that any such movement is not transmitted to the gearbox housing 41.

The encoder module 70 shown in FIGS. 6 and 7 is designed to be a single module which can be built and tested separately in order to ensure that the components are aligned correctly and are functioning correctly. Once the encoder module 70 is certified, it can be inserted into the gearbox assembly. From the position shown in FIG. 4, it is inserted up inside the gearbox housing 41 into the position shown in FIG. 5 and then secured in place using bolts 76 and 87.

Once in place, the next robot arm linkage is attached to the lower housing plate 45 by the mounting orifices 56 so it can rotate on the plate 45. If a problem is encountered with the encoder module, it is simply a matter of removing the cover shell 17 of an adjacent linkage to expose the lower housing plate 45 and then removing the bolts 76 and 87. The wires W are detachable at either end. It will be appreciated from FIG. 5 that this can be done without access to the internal space of the gearbox housing 41. The encoder module 70 can simply be replaced or repaired.

As mentioned earlier, each drive train is required to allow the passage of wiring along the output axis 72. In the present case, the path for the wiring is illustrated in FIG. 5 in dotted lines using the reference W. From the top down, the wiring W enters the housing 41 via the central orifice 54. It then extends down through the middle of the annular gear 48 inside the sleeve-like structure 84 of the encoder support bracket 80 and extends down through the central opening 73 of the lower support plate 71 which provides a passage through the centre of the lower housing plate 45. As will be appreciated from FIG. 5, the motor assembly 20 is offset from the output axis 72 and therefore does not disrupt the passage of the wiring W.

CLAUSES

1. A drive train comprising:
    a motor assembly comprising an electric motor and a rotatable shaft defining an input axis, the shaft comprising a first set of gear teeth;
    a gear box assembly comprising an annular gear comprising a second set of gear teeth which intermesh with the first set of gear teeth, and a housing comprising a fixed portion to which the motor assembly is mounted and a rotatable portion fixed to the annular gear and providing the output from the drive train about an output axis offset from the input axis;
    wherein
    a central opening is defined through the gearbox assembly in alignment with the output axis and passing through the housing and the annular gear, the motor assembly being mounted so as not to obstruct the central opening.
2. A drive train according to clause 1, further comprising an encoder assembly to measure the rotation at the output axis;
    the encoder assembly comprising an annular first portion mounted to the rotatable portion of the gearbox assembly about the central opening, and a second portion fixed with respect to the fixed portion of a gearbox assembly housing to measure the rotation of the annular first portion.
3. A drive train according to clause 2, further comprising a main bearing between the fixed and rotatable parts of the housing of the gear box assembly, and an encoder bearing between the first and second portions of the encoder to rotatably support and maintain the alignment of the first and second portions of the encoder.

4. A drive train according to clause 2 or clause 3, wherein the mounting for the second portion of the encoder with respect to the fixed portion of the gearbox is flexible in a direction transverse to the output axis.
5. A drive train according clause 4, wherein the flexible mounting comprises a hollow sleeve arranged around the central opening.
6. A drive train according to any of clauses 2 to 5, wherein the encoder assembly is provided as a unitary assembly removable together from the gear box assembly housing without requiring disassembly of the housing.
7. A drive train according to any preceding clause, comprising a planetary gearbox to transmit power between the motor and rotatable shaft.
8. A drive train according to any preceding clause, wherein the annular gear comprises two annular components each having teeth which are offset from one another and which together comprise the second set of gear teeth, the two annular components being concentrically mounted adjacent to each other and being circumferentially biased with respect to one another to generate a pinching force on the first set of gear teeth.
9. A drive train according to any preceding clause, wherein the second set of gear teeth are on an inner face of the annular gear.
10. A drive train according to any preceding clause, wherein the rotatable portion of the gearbox housing has means for attaching to an external component.
11. A robot arm linkage comprising a drive train according to clause 10 attached to one end of the arm, an adjacent linkage being attachable to the means for attaching an external component, and wherein wires for the adjacent arm linkage pass through the central opening.
12. A robot arm having a plurality of linkages according to clause 11 attached together.
13. A robot arm according to clause 12, wherein the encoder for a respective drive train is removable without removing an adjacent arm linkage.

The invention claimed is:
1. A drive train comprising:
a motor assembly comprising an electric motor and a rotatable shaft defining an input axis, the shaft comprising a first set of gear teeth;
a gear box assembly comprising an annular gear comprising a second set of gear teeth which intermesh with the first set of gear teeth, and a housing comprising a fixed portion to which the motor assembly is mounted and a rotatable portion fixed to the annular gear and providing the output from the drive train about an output axis offset from the input axis; and
an encoder assembly to measure the rotation at the output axis;
wherein:
a central opening is defined through the gearbox assembly in alignment with the output axis and passing through the housing and the annular gear, the motor assembly being mounted so as to not obstruct the central opening;
the encoder assembly comprises an annular first portion mounted to the rotatable portion of the gearbox assembly about the central opening, and a second portion fixed with respect to the fixed portion of the housing of the gearbox assembly housing to measure the rotation of the annular first portion; and
a main bearing between the fixed and rotatable portions of the housing of the gear box assembly, and an encoder bearing between the first portion and the second portion of the encoder to rotatably support and maintain the alignment of the first and second portions of the encoder.
2. A drive train according to claim 1, wherein the rotatable portion of the housing of the gearbox assembly has means for attaching to an external component.
3. A robot arm linkage comprising a drive train according to claim 2 attached to one end of the arm, an adjacent linkage being attachable to the means for attaching an external component, and wherein wires for the adjacent arm linkage pass through the central opening.
4. A robot arm having a plurality of linkages according to claim 3 attached together.
5. A robot arm according to claim 4, wherein the encoder for a respective drive train is removable without removing an adjacent arm linkage.
6. A drive train according to claim 1, wherein the mounting for the second portion of the encoder with respect to the fixed portion of the housing of the gearbox assembly is flexible in a direction transverse to the output axis.
7. A drive train according to claim 6, wherein the flexible mounting comprises a hollow sleeve arranged around the central opening.
8. A drive train according to claim 1, wherein the encoder assembly is provided as a unitary assembly removable together from the housing of the gear box assembly without requiring disassembly of the housing.
9. A drive train according to claim 1, further comprising a planetary gearbox to transmit power between the motor and rotatable shaft.
10. A drive train according to claim 1, wherein the annular gear comprises two annular components each having teeth which are offset from one another and which together comprise the second set of gear teeth, the two annular components being concentrically mounted adjacent to each other and being circumferentially biased with respect to one another to generate a pinching force on the first set of gear teeth.
11. A drive train according to claim 1, wherein the second set of gear teeth are on an inner face of the annular gear.
12. A drive train comprising:
a motor assembly comprising an electric motor and a rotatable shaft defining an input axis, the shaft comprising a first set of gear teeth;
a gear box assembly comprising an annular gear comprising a second set of gear teeth which intermesh with the first set of gear teeth, and a housing comprising a fixed portion to which the motor assembly is mounted and a rotatable portion fixed to the annular gear and providing the output from the drive train about an output axis offset from the input axis; and
an encoder assembly to measure the rotation at the output axis;
wherein:
a central opening is defined through the gear box assembly in alignment with the output axis and passing through the housing and the annular gear, the motor assembly being mounted so as to not obstruct the central opening;
the encoder assembly comprises an annular first portion mounted to the rotatable portion of the gearbox assembly about the central opening, and a second portion fixed with respect to the fixed portion of the housing of the gear box assembly to measure the rotation of the annular first portion; and the mounting for the second portion of the encoder with respect to the fixed portion of the housing of the gearbox assembly is flexible in a direction transverse to the output axis.

13. A drive train according to claim 12, wherein the flexible mounting comprises a hollow sleeve arranged around the central opening.

\* \* \* \* \*